United States Patent
Weinrich et al.

[11] 3,948,367
[45] Apr. 6, 1976

[54] CLUTCH RESPONSIVE TO TORQUE OF TORQUE CONVERTOR

[75] Inventors: Hellmut Weinrich, Zang; Heinrich Dick, Heidenheim, both of Germany

[73] Assignee: Voith Getriebe KG, Heidenheim (Brenz), Germany

[22] Filed: June 22, 1972

[21] Appl. No.: 265,286

[30] Foreign Application Priority Data
June 29, 1971 Germany............................ 2132144

[52] U.S. Cl............................. 192/3.33; 74/733
[51] Int. Cl.²................................. F16D 39/00
[58] Field of Search............ 192/56 F, 3.33; 74/733, 74/732

[56] References Cited
UNITED STATES PATENTS

| | | | |
|---|---|---|---|
| 3,202,018 | 8/1965 | Hilpert | 192/3.33 X |
| 3,384,209 | 5/1968 | Murphy | 192/3.33 |

*Primary Examiner*—Benjamin W. Wyche
*Attorney, Agent, or Firm*—Herbert L. Lerner

[57] ABSTRACT

A torque-delivering vehicle drive system having a friction clutch actuated by a pressurized medium, a hydrodynamic working circuit including a pump wheel and a turbine wheel, operatively connected to the friction clutch and a device including an operating lever for adjusting pressure and/or rate of flow of the pressurized medium to the friction clutch including a regulating device for maintaining the torque delivered by the vehicle drive system at a constant value corresponding to a given position of the operating lever, and means for supplying to the regulating device a measured quantity that is a function of a difference in working fluid pressure producible by the pump wheel of the hydrodynamic working circuit.

7 Claims, 5 Drawing Figures

Fig. 1
Fig. 2
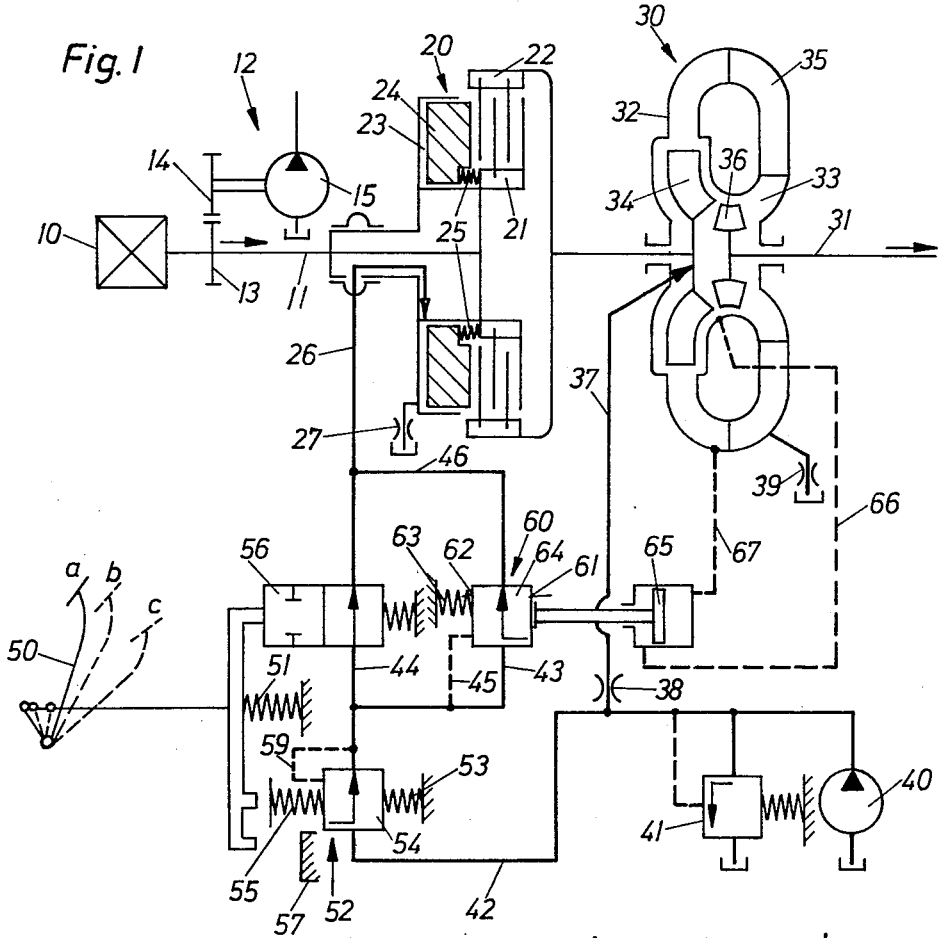
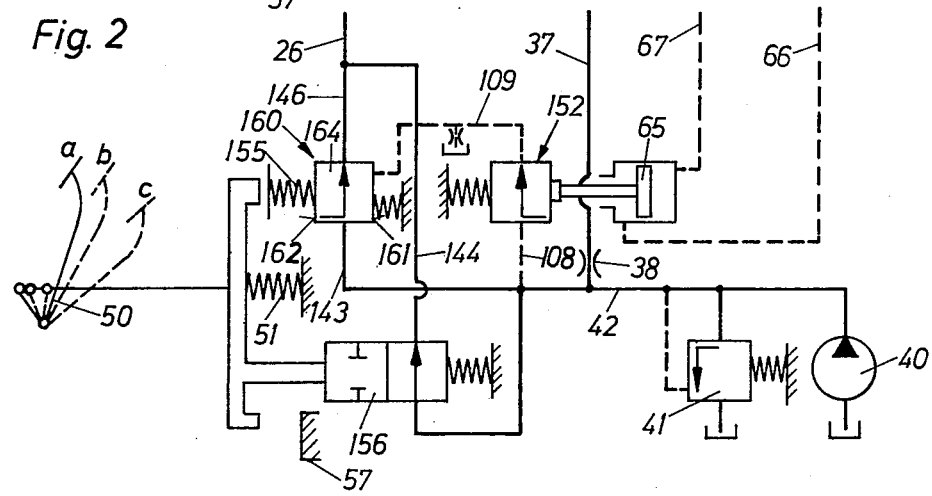

CLUTH RESPONSIVE TO TORQUE OF TORQUE CONVERTOR

The invention relates to a vehicle drive system having a friction clutch operated by a pressurized medium, and a hydrodynamic working circuit (torque converter or coupling) connected beyond the friction clutch and having a pump wheel and turbine wheel as well as to a device for adjusting the pressure and/or the throughput or rate of flow of the pressure medium by means of an operating lever, such as a clutch pedal, for example.

Heretofore known drive systems of this type (Voith Getriebe KG Prospectus No. G 517) are preferably employed in fork-lift trucks or similar vehicles, wherein the vehicle engine drives not only the power-driven wheels but also, by means of a so-called auxiliary drive, whatever auxiliary devices that are present, such as a lifting mechanism, for example. A frequent occurrence then is that the transport drive and the auxiliary drive are in operation simultaneously, so that the engine power has to be branched to both drives. The friction clutch which is always located beyond the branching point, is actuated, in a manner conventional to motor vehicles, by means of a clutch pedal so as to be fully or nearly fully opened when the clutch pedal is depressed, and closed when the clutch pedal is released. In intermediate positions of the clutch pedal, the friction clutch can transmit torques of different values in slippage operation. This slippage operation is preferably employed when, for example, a load is to be lifted rapidly at high engine speed by means of the auxiliary drive, while the vehicle has to be driven simultaneously toward a specific location at a very low speed with an accuracy measured in centimeters. In technical jargon, such a mode of travel is called "inching".

It is precisely when inching, however, that the heretofore known driving systems have the disadvantage that an undesired variation occurs in the torque delivered by the traveling drive, and consequently a variation in the traveling speed when the engine speed is varied so as to vary the lifting speed, so that the inching becomes very difficult. As explained in greater detail hereinafter, such a variation in the engine speed in fact results in a variation of the output torque or speed of the friction clutch, not only when the friction clutch is fully closed but also when it is in slippage operation. It is therefore often necessary to return the torque delivered by the traveling drive to the desired value again by varying the position of the clutch pedal. This calls for increased alertness by the driver, since he must of course devote his full attention simultaneously to the lifting operation.

If the engine speed is altered during slippage operation of the friction clutch, a variation in the delivered torque or speed results because, in a friction clutch controlled by a pressurized liquid, the pressure space receiving the operating piston and pressurized liquid rotates therewith, and the liquid located therein is thus subjected to centrifugal force i.e. the pressure of the liquid is not determined solely by the position of the clutch pedal, but also by the engine speed at the time. In other words, with increasing engine speed, the torque transmitted by the friction clutch is increased, and vice versa.

A heretofore known construction seeks to eliminate this undesired influence of the engine speed by feeding liquid to the aforementioned piston on both sides thereof, i.e. on one side conventionally pressurized liquid having a pressure depending both on the position of the clutch pedal as well as on the magnitude of the centrifugal force and on the other side thereof a non-pressurized liquid which acts on the piston with a pressure that is therefore determined solely by the centrifugal force. The counteracting pressures produced by the centrifugal force thereby cancel one another out.

This heretofore known construction, however, is very expensive and also therefore quite unsatisfactory because it requires an increase in the overall length of the friction clutch. In addition, it has been found that during slippage operation of the friction clutch, the ratio between the pedal position and the delivered torque is evidently also affected by other disturbing factors, which cannot be eliminated by the aforedescribed known construction.

It is accordingly an object of the invention to provide an improved vehicle drive system of the aforedescribed general type which delivers a torque or speed that is kept constant during slippage operation of the friction clutch while the operating lever is maintained in unchanged position.

It is further an object of the invention to provide such an improved vehicle drive system with regulating devices that are simple to manufacture and that simultaneously operate reliably and primarily without delay.

With the foregoing and other objects in view, there is provided in accordance with the invention in a torque-delivering vehicle drive system having a friction clutch actuated by a pressurized medium, a hydrodynamic working circuit including a pump wheel and a turbine wheel, operatively connected to the friction clutch and a device including an operating lever for adjusting pressure and/or rate of flow of the pressurized medium to the friction clutch, a regulating device for maintaining the torque delivered by the vehicle drive system at a constant value corresponding to a given position of the operating lever, and means for supplying to the regulating device a measured quantity of said torque that is a function of a difference in working fluid pressure producible by the pump wheel of the hydrodynamic working circuit and the position of the control lever.

In accordance with more specific features of the invention, the measured quantity supplied to the regulating device by the recited means is the pressure difference per se or a quantity dependent thereon.

In accordance with other features of the invention, a regulating circuit is provided for maintaining constant the torque delivered by the vehicle drive system in slippage operation of the friction clutch, the said measured quantity being comparable in the regulating device with a nominal quantity that is adjustable by means of the operating lever and, upon a deviation of the measured quantity from the nominal quantity, the pressure and/or rate of flow of the pressurized medium is adjusted.

In accordance with an added feature of the invention, there is provided in a supply line for the pressurized medium to the friction clutch, a control valve with a control piston which has a first pressure face acting in the "opening" direction of the friction clutch, and a second pressure face acting in the "closing" direction of the friction clutch, the first pressure face being subjectible to a force which increases with the pressure difference (measured quantity), and the second pressure face being subjectible to a force which decreases with increasing throw of the operating lever (i.e. with decreasing nominal quantity).

It is of course also possible, in accordance with the invention, for the just-mentioned two forces not to be dependent on the measured quantity or the nominal quantity in the above-mentioned manner, but rather just the reverse. In other words, the same effect is obtained when the first pressure face is subjected to a force which decreases with increasing pressure difference, and when the second pressure face is subjected to a force which increases with the throw of the operating lever. In general, the first-mentioned embodiment is preferred, however.

Furthermore, two cases are to be distinguished in the foregoing embodiments:

a. The pressurized medium acts in closing direction of the friction clutch in opposition to a spring force opening the friction clutch. In this case, the aforementioned first pressure face of the control piston must act in the closing direction of the control valve, and the aforementioned second pressure face must act in the opening direction of the control valve. This is the usual case in fork-lift trucks and similar vehicles.

b. The pressurized medium acts in the opening direction of the friction clutch in opposition to a spring force closing the friction clutch. The directions in which the pressure faces of the control piston act, which are mentioned in paragraph (a) above, must then be interchanged.

As already indicated in the foregoing, it is assumed in both cases that the operating lever, (for example the clutch pedal), in released condition thereof, is held in its starting position by a spring, as is usual in motor vehicles, and that an increasing throw of the operating lever acts in the opening direction of the friction clutch.

Hereinafter described embodiments are related to the case noted hereinbefore in paragraph (a). In principle, however, the invention is applicable to the cases in both paragraphs (a) and (b).

In accordance with a particularly advantageous embodiment of the invention, a pressure-reducing valve, adjustable by the operating lever, is provided in the supply line for the pressurized medium, the pressure-reducing valve being connected forward of the control valve, and in the control valve, the force acting on the second pressure face is applied by the pressure prevailing at the outlet side of the pressure-reducing valve. This pressure-reducing valve, therefore, delivers at its outlet side a liquid pressure having a value that depends upon the throw of the operating lever, the pressure decreasing with increasing lever throw. This pressure is therefore employable in the control valve for applying the force acting on the second pressure face. To accomplish this, it is not in itself necessary for the pressure-reducing valve to be connected forward of the control valve. On the contrary, both of these valves are also connectible in parallel so that the pressurized medium which actuates the friction clutch alone flows through the control valve, while the pressure-reducing valve delivers to the second pressure face of the control valve only the pressure necessary for the control process. Applicants have, however, recognized that by connecting the two valves serially in the aforementioned manner, a further decided advantage can be secured. In fact, by this means, the pressure of the pressurized medium to be supplied to the friction clutch can first be varied very rapidly to a considerable extent in the pressure-reducing valve by actuation of the operating lever (pre-control), so that the regulating device, by means of the control valve, need only make additional comparatively minor corrections in order to obtain the exact respective torque value desired (fine regulation for the purpose of compensating the disturbance factors). Very stable regulation is thereby attained. This embodiment also affords space-saving disposition of the pressure-reducing valve and control valve in a common housing and reliable adjustment of the functions to be performed by the two valves.

In order to avoid a reduction in the pressure of the pressurized medium by the control valve when the operating lever is released, i.e. with the friction clutch fully closed, a by-pass line extending around the control valve is provided, and comprises an open-and-shut valve, which is open when the operating lever is released and is closed at lever throws above about 15 to 35 percent of the full lever throw.

In accordance with a concomitant feature of the invention, the hydrodynamic working circuit is constructed as a torque converter in which, in the direction of flow of the working liquid, a stationary blade ring is connected beyond the pump wheel, and the turbine wheel is connected beyond the stationary blade ring. Such a torque converter is particularly well suited for the embodiment of the invention, because it has stationary working space walls and because, simultaneously, the distance from the pump wheel outlet (in the direction of flow) to the turbine wheel inlet is very great, so that the connection of a measuring line for determining the pressure of the working liquid on the outlet side of the pump wheel present no difficulties. In contrast, in a converter having a turbine wheel inlet which is separated from the pump wheel outlet by only a small gap, or in a converter with rotating working-space walls, or in a fluid coupling which always has only rotating working-space walls, much greater expenditure must be incurred for the connection of the measuring conduit.

In accordance with another, particularly simple feature of the invention, a supply line is provided for the continuous supply of working liquid to the working space of the converter, and a pressure-limiting valve is connected to the supply line for maintaining constant the pressure of the liquid in the supply line. Since the pressure in the supply line is, in fact, with good approximation, equal to the pressure on the inlet side of the pump wheel, it is sufficient, owing to the provision of the aforementioned pressure-limiting valve, to pick up the pressure of the liquid on the outlet side of the pump wheel alone as a measure of the torque delivered by the converter, it being unnecessary therefore to determine the difference between the pressures on both sides of the pump wheel.

In accordance with yet another feature of the invention, there is provided a hollow shaft passing centrally through the converter for supplying the working liquid to the working space of the converter. In such a case, the pressure of the working liquid, regulated to a constant value by the aforementioned pressure-limiting valve, may deviate again on passing from the stationary supply line to the rotating hollow shaft. To obviate this, in accordance with an added feature of the invention, the pressure-limiting valve is located inside the hollow shaft. This is realizable constructively in a very simple manner by providing an inlet orifice at one end of the hollow shaft and an outlet orifice for the working liquid in the central region of the hollow shaft, i.e. in the vicinity of the pump wheel inlet and locating the pressure-limiting valve at the other end of the hollow shaft, the control piston of the pressure-limiting valve being advantageously guided parallel to the hollow shaft and having a central outlet orifice, for the overflowing working liquid.

Other features which are considered as characteristic of the invention are set forth in the appended claims.

Although the invention is illustrated and described herein as embodied in vehicle drive system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings, in which:

FIG. 1 is a diagrammatic view of a vehicle drive system with the control devices according to the invention for operating the friction clutch;

FIG. 2 is a view similar to that of the lower part of FIG. 1 showing a modified disposition of the control devices of FIG. 1;

In all of the figures, similar parts are identified by the same reference numeral.

Figure 3:
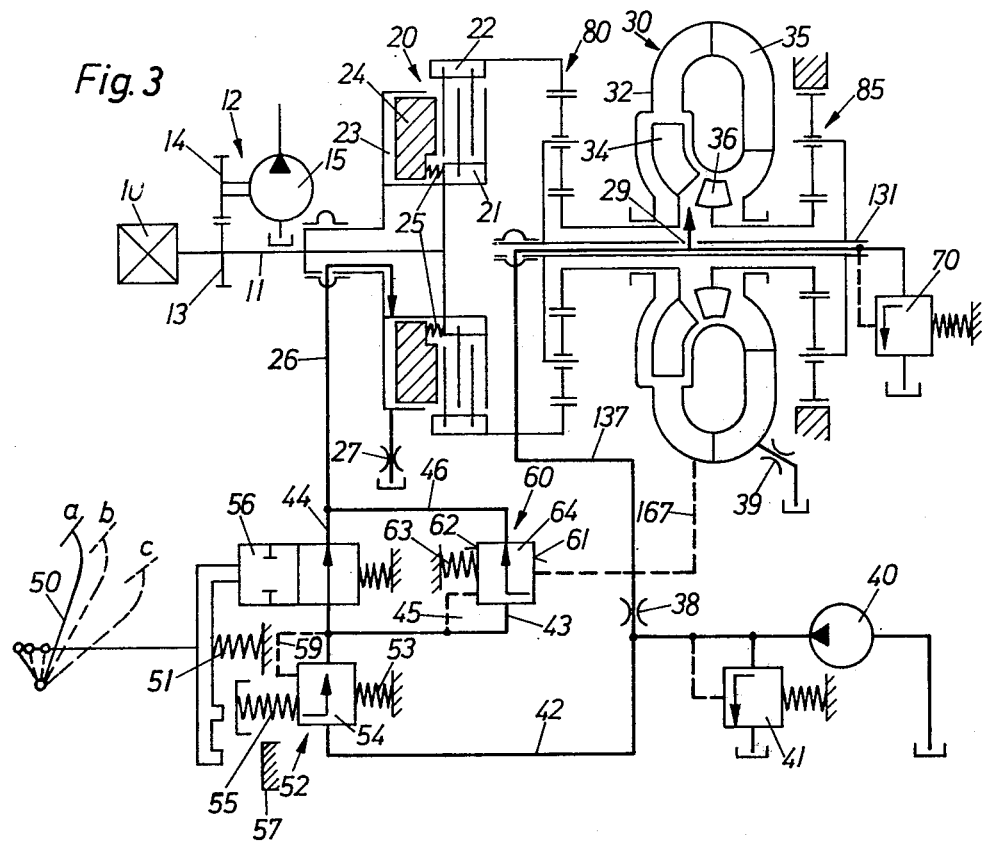
FIG. 3 is a view similar to that of FIG. 1 showing a vehicle drive system wherein the control devices appertaining thereto are modified relative to those of FIG. 1.

Referring now to the drawings and first particularly to FIG. 1 thereof, there is shown therein a vehicle drive system which has an engine 10, with an output shaft 11 connected to a friction clutch 20. Connected beyond the latter is a hydrodynamic torque converter 30, having an output shaft 31 which is connected in a conventional manner to the driven vehicle wheels, not shown in the drawing. A usually provided reversing gear which is connected beyond the converter 30, is also not illustrated in the drawing. Further coupled to the output shaft 11 of the engine 10 is an auxiliary drive 12 having a hydrostatic pump 15 driven by transmission gears 13 and 14. The pump 15 serves to supply pressurized liquid to a non-illustrated lifting mechanism of a forklift, for example.

The friction clutch 20, constructed as a multiple disc clutch, is formed in a conventional manner of a primary part 21 and a secondary part 22. Connected to the primary part is an annular cylinder chamber 23, in which there is disposed a correspondingly annular piston 24 for pressing together the friction discs of the clutch 20 in opposition to the force of springs 25. The pressurized liquid required for displacing the piston 24 enters the cylinder chamber 23 through a line 26 and then returns by way of a throttle 27 to an oil sump.

The converter 30, as usual, has a housing 32 with a toroidal working space 33. A pump wheel or impeller 34, connected to the secondary part 22 of the friction clutch 20, has working liquid flowing centrifugally through it, while flow through the blade ring 35, which is rigidly connected to the housing 32, is mainly in centripetal direction. A turbine wheel 36, which is connected to a driven shaft 31, is disposed in the radially inner region of the working space 33 on the suction side of the pump wheel 34, and is traversed by flow in axial direction. The working liquid flows to the converter 30 through a line 37 provided with a throttle 38, and leaves it again through a throttle 39.

The vehicle drive system of the invention is supplied with pressurized and working liquid by means of a pump 40, which has a non-illustrated drive that is coupled to the engine 10. On the pressure or delivery side of the pump 40, there is a pressure-limiting valve 41 for adjusting to a constant pressure of liquid.

Control of the flow of liquid to be supplied to the friction clutch 20 by the conduit 26 is by means of a clutch pedal 50, a pressure-reducing valve 52 similar to Valve 8 in U.S. Pat. No. 3,722,646, controllable by means of the clutch pedal, a control valve 60 similar to Valve 8 in U.S. Pat. No. 3,722,646 connected beyond the pressure-reducing valve 52, and a shut-off valve 56, actuated by means of the clutch pedal 50 and located in a by-pass line 44 extending around the control valve 60.

In released condition, the clutch pedal 50 is held by the spring 51 in the position a shown in solid lines. In this case, the pressurized liquid flows from the pump 40 through the line 42 and through the pressure-reducing valve 52, which is fully opened by a spring 53, then successively through the by-pass line 44, the open shut-off valve 56 and finally the line 26 into the friction clutch 20.

If the clutch pedal 50 is depressed from the position a thereof to the dotted line position b thereof, the shut-off valve 56 is closed so that the pressurized liquid must then flow through the control valve 60 by way of the line 43, 46. Advantageously, the control valve 60 is constructed as an adjustable throttle valve, which even in the fully open condition thereof throttles the liquid in such a manner that, while the pressure-reducing valve is still fully open, the friction clutch 20 can begin to slip.

In the region of the clutch pedal 50 between the positions b and c, above about 15 to 35 percent of full lever throw position the shut-off valve 56 always remains closed, and the control piston 54 of the pressure-reducing valve 52 is urged by the spring 55 to a greater or lesser extent to the right-hand side, as viewed in FIG. 1, so that the pressure on the outlet side of the valve 52 is reduced to a greater or lesser extent, respectively. This pressure is thus a measure of the position of the clutch pedal 50 or, more exactly stated, of the distance of the particular position of the pedal from the position b thereof. This distance is referred to as "throw" herein.

The control valve 60 serves for a further correction of the pressure of the liquid; it has a control piston 64 formed with a first pressure face 61 and a second pressure face 62 located opposite the first pressure face. Pressing on the first pressure face 61 is an auxiliary piston 65 which can be subjected on both sides thereof to pressurized liquid, on the side facing the valve 60 by liquid delivered through a line 66 at the pressure prevailing on the inlet side of the converter pump wheel 34, and on the opposite side facing away from the valve 60, through the line 67 at the pressure prevailing on the outlet side of the converter pump wheel 34. The force exerted by the auxiliary piston 65 on the first pressure face 61 corresponds, therefore, to the pressure difference produced by the pump wheel 34 in the working liquid of the converter 30 and hence to the torque delivered by the converter through the output shaft 31. Acting upon the second pressure face 62 of the control piston 64 through the control line 45 is the aforementioned liquid pressure which prevails at the outlet side of the pressure-reducing valve 52 and represents the throw of the clutch pedal 50. In addition, a compensating spring 63 also acts on the pressure face 62.

The mode of action of the control valve 60 thus corresponds to that of a regulating device. The measured value is the force exerted on the first pressure face 61 and the nominal value is the force acting on the second pressure face 62. Due to the counteraction of the two forces, a comparison of one with the other is made, a deviation of the measured quantity from the nominal quantity producing a corresponding shift of the control piston 64. If equilibrium is disturbed, for example by the fact that the engine speed and hence the torque delivered to the shaft 31 are increased, the force acting on the first pressure face 61 is then increased and produces a displacement of the control piston 64 to the left-hand side as viewed in FIG. 1, i.e. in the closing direction of the control valve 60. The pressure in the cylinder space 23 of the friction clutch 20 is thereby reduced and the transmissible torque is accordingly decreased until equilibrium again prevails at the control piston 64, i.e. until the torque delivered by the output shaft 31 again corresponds to the nominal quantity predetermined by the respective throw of the clutch pedal 50.

At very high engine speed and with a very low torque to be transmitted, the situation may arise wherein the cylinder space 23 of the friction clutch 20 is only partly filled (in the outer region) with pressurized liquid, and consequently the pressure in the lines 26 and 46 drops to atmospheric pressure or even lower. In this case, therefore, an adjustment of the pressure of the pressurized liquid no longer occurs in the control valve 60 during control operations, but rather, only an adjustment of the rate of flow. For this case, it is expedient to construct the valve 52 as pressure regulating valve (control conduit 59), so that (for the same pedal throw) the pressure on the inlet side of the control valve 60 is maintained constant.

In FIG. 2, there is shown an embodiment of the control devices modified with respect to that of FIG. 1. The vehicle drive system proper (the engine 10, the friction clutch 20 and the converter 30) is the same as that of FIG. 1 and is therefore not illustrated in FIG. 2. The essential difference of the embodiment of FIG. 2 over that of FIG. 1 is that in the former the forces acting on the two pressure faces 161 and 162 of the control piston 164 of the control valve 160 depend inversely on the measured quantity or nominal quantity, whereas in the embodiment of FIG. 1, the force acting on the first pressure face 61 increases with increasing pressure difference produced by the pump wheel 34 in the embodiment of FIG. 2, the force acting on the first pressure face 161 decreases with increasing pressure difference. This is achieved by the auxiliary piston 65 acting on a pressure-reducing valve 152 in the closing direction. Thus, a control pressure supplied through the line 108 is reduced in proportion to the increase in the pressure difference. The control pressure in this way, representing the torque delivered by the output shaft 31, passes through the line 109 to the first pressure face 161 of the control valve 160. Whereas, in the embodiment of FIG. 1, moreover, the force acting on the second pressure face 62 of the control valve 60 decreases with increasing throw of the clutch pedal 50, in the embodiment of FIG. 2, the force acting on the second pressure face 162 increases with increasing pedal throw. This results from the fact that the clutch pedal 50 acts directly on the control piston 164 through the spring 155.

The effect obtained with the embodiment of FIG. 2 is the same as with the embodiment of FIG. 1. If, for example, the torque delivered by the output shaft 31 is higher than predetermined by the clutch pedal 50, the piston of the pressure-reducing valve 152 is shifted in closing direction, thereby reducing the force acting on the first pressure face 161 of the control valve 160. Consequently, the control piston 164 is also shifted in the closing direction, i.e. to the right-hand side of FIG. 2, thereby reducing the pressure and/or the rate of flow in the conduit 26 leading to the friction clutch 20, until equilibrium prevails again at the control piston 164.

In the vehicle drive system shown in FIG. 3, which differs from that of FIG. 1 only in a few details, the output shaft 131 is constructed as a hollow shaft. The working liquid is supplied to the converter 30 through the hollow output shaft 131. The supply line 137 is connected to one end of the hollow shaft 131. In the vicinity of the inlet side of the pump wheel 34 of the converter 30, the hollow shaft 131 has a radial orifice 29 for passage of the working liquid from the hollow shaft to the converter working space 33. On the other end of the hollow shaft 131, there is provided a pressure-limiting valve 70 (note also FIG. 4) which maintains constant the liquid pressure inside the hollow shaft 131 and hence on the inlet side of the pump wheel 34. Thereby, only the pressure prevailing on the outlet side of the pump (line 167) needs to be picked up as a measure of the delivered torque. The line 66 and auxiliary piston 65, which in the embodiment of FIG. 1 are still necessary, are dispensed with in the embodiment of FIG. 3. The line 167 can thus be led directly to the first pressure face 61 of the control piston 60. A particularly simple embodiment can be obtained in this case by fitting the control valve 60 directly on the converter housing 32. The other valves 52 and 56 may also be mounted on the converter housing 32 in the immediate vicinity of the control valve 60.

A further difference between the embodiments of FIGS. 1 and 3 is that in FIG. 3 the torque delivered by the friction clutch 20 is distributed in a conventional manner by a planetary gearing 80 over two power paths i.e. on the one hand over a hydrodynamic power path passing through the converter 30 and the planetary wheel set 85, and on the other hand over a purely mechanical power path passing through the hollow shaft 131. The two power paths are reunited beyond the planetary wheel set 85.

Figure 4:
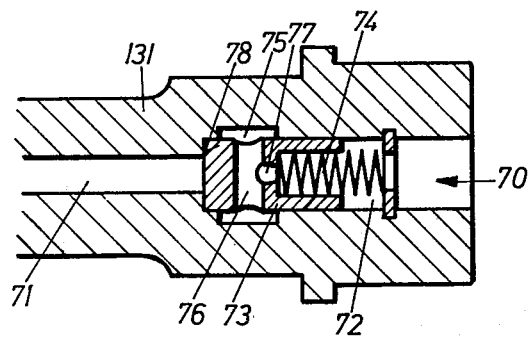
FIG. 4 is a fragmentary longitudinal sectional view of the hollow shaft extending centrally through the converter according to FIG. 3.
Figure 3A:
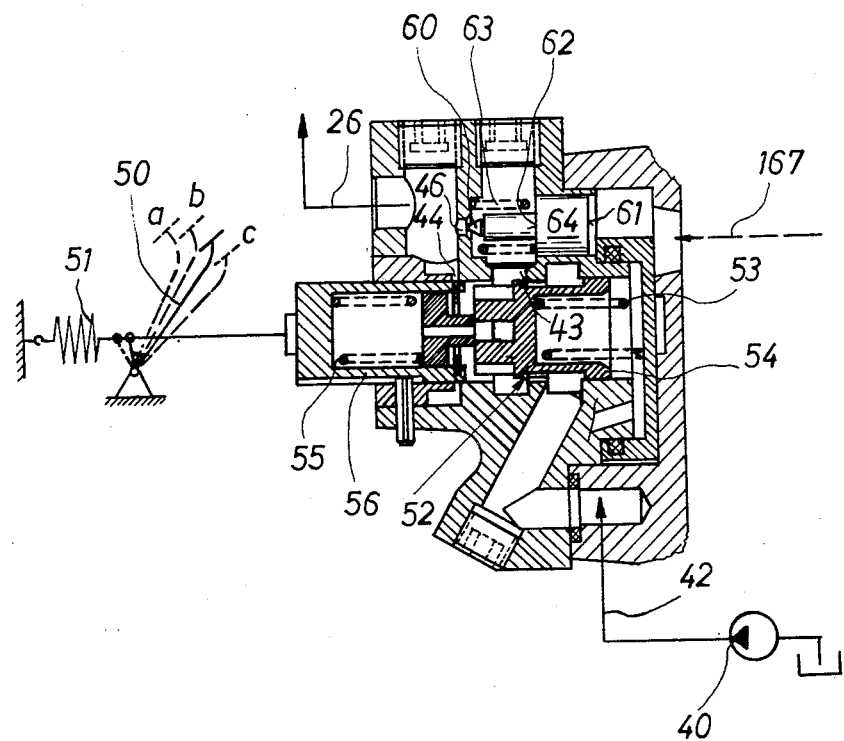
FIG. 3A is a detailed cross sectional view of a control device.

The output end of the hollow shaft 131 with the built-in pressure-limiting valve 70 is shown in longitudinal section in FIG. 4. Adjoining the central bore 71 passing through the entire shaft is a hollow space constructed as a cylinder 72, in which a piston 73 is reciprocably mounted. The piston 73 is urged by a spring 74 against the radial transition face 78 located between the bore 71 and the cylinder 72, thereby closing the interior of the hollow shaft 131 from the outside. Not far from the transition face 78, there is provided in the cylinder 72 an annular groove 75, which is in communication with a transverse bore 76 machined in the piston 73 and an adjoining longitudinal bore 77 opening to the outside. If an excess of liquid pressure occurs in the interior of the hollow shaft 131, the piston 73 yields in a conventional manner against the prestress force of the spring 74, working liquid thereby flowing outwardly from the interior of the hollow shaft 131 until the pressure has reached the desired value.

Common to all the embodiments of FIGS. 1 to 3 is the symbolically represented stop 57, which determines the position c of the clutch pedal. This stop 57 is advantageously adjustable, for example by means of a screwthread, the minimum torque delivered by the output shaft 31 thereby being fixable at any desired value.

A particular advantage of the regulating device of the invention is that no special complicated measuring devices are required for obtaining the measured value i.e. the torque delivered by the drive system, but rather it is merely necessary to determine the pressure difference in the working liquid which is produced by the pump wheel of the hydrodynamic working circuit and which represents a sufficiently exact measure of the delivered torque. The problem of torque measurement which is usually solved only at considerable expense, is consequently solved in a particularly simple manner in accordance with the invention.

A vehicle drive system is therefore provided according to the invention, whereof the output torque, in slippage operation of the friction clutch, depends solely on the position of the operating lever. In doing this, not only is the influence of varying engine speeds eliminated but, moreover, all other disturbing factors, such as variations in the coefficient of friction of the clutch frictional surfaces or variations in the viscosity of the liquid serving to lubricate and cool the friction surfaces, or also variations in the viscosity of the working liquid of the hydrodynamic circuit, can be rendered harmless by the invention.

Another advantage of the invention which is not readily attainable with heretofore known vehicle drive systems, is that by relatively simple means, for example by means of a stop limiting the maximum throw of the operating lever, adjustment can be made to an extremely small necessary output torque and, in this operating condition, the vehicle can be brought directly to a stop by means of a brake, after which it is ready, moreover, to be moved off again without any delay because, during such a stoppage with the engine running, the torque transmission in the friction clutch and thereby to the turbine wheel of the working circuit, which is coupled to the output shaft, remains unaltered. This advantage is of particular importance in the case of fork-lift trucks and similar vehicles, which frequently have to make very short traveling movements.

We claim:

1. In a torque-delivering vehicle drive system having a friction clutch actuated by a pressurized medium, a hydrodynamic working circuit, including a pump wheel and a turbine wheel, operatively connected to the friction clutch and a control device including an operating lever for adjusting pressure of the pressurized medium to the friction clutch, the control device being part of a regulating device for maintaining the torque delivered by the vehicle drive system at a constant value corresponding to a given position of the operating lever by controlling pressure of the pressurized medium to the friction clutch, and means for supplying to said regulating device a measured signal corresponding to said torque, said measured quantity being a function of the difference between working fluid pressure on the outlet side of the pump wheel of the hydrodynamic working circuit and working fluid pressure on the inlet side of said pump wheel.

2. Drive system according to claim 1 including line means for supplying pressurized medium to the friction clutch, and wherein said regulating device includes a control valve located in said line means and having a control piston formed with a first pressure face acting in opening direction of the friction clutch, and a second pressure face acting in closing direction of the friction clutch, and means for subjecting said first pressure face to a force increasing with said difference in working fluid pressure and hence with said measured signal, and means for subjecting said second pressure face to a force decreasing with increasing throw of the operating lever and hence with decreasing nominal value.

3. Drive system according to claim 2 including a pressure-reducing valve located in said pressurized medium supply line means and having an outlet side, said pressure-reducing valve being operatively engageable by the operating lever so as to be adjustable thereby, said pressure-reducing valve being connected to said control valve upstream thereof in flow direction of said pressurized medium in said supply line means, said force to which said second pressure face is subjectible being applicable by the pressure prevailing at said outlet side of said pressure-reducing valve.

4. Drive system according to claim 2 including a by-pass unit by-passing said control valve in said line means, and an open-and-shut valve in said by-pass unit, said open-and-shut valve being open in released position of said operating lever and being closed at lever throw positions above a predetermined percentage of full lever throw position.

5. Drive system according to claim 1 wherein the hydrodynamic working circuit comprises a torque converter wherein, in direction of flow of a working liquid therethrough, a stationary blade ring is connected downstream of the pump wheel, and the turbine wheel is connected downstream of said stationary blade ring.

6. Drive system according to claim 5 wherein the torque converter has a working space, and including supply line means for supplying working liquid thereto, and a pressure-limiting valve connected to said working liquid supply line means for maintaining constant the pressure of working liquid in said working liquid supply line means.

7. Drive system according to claim 6 including a hollow shaft extending through the torque converter, said pressure-limiting valve being mounted inside said hollow shaft.

* * * * *